United States Patent
Schneider et al.

(10) Patent No.: US 6,896,108 B2
(45) Date of Patent: May 24, 2005

(54) SYSTEM FOR CONTROLLING THE TEMPERATURE OF A VEHICLE DRIVELINE COMPONENT UTILIZING FORCED AIR FLOW

(75) Inventors: Mark M. Schneider, Royal Oak, MI (US); Larry W. Bowman, Troy, MI (US); Eric B. Ratts, Northville, MI (US); Paul R. Sieber, Rochester Hills, MI (US); Robert W. Hildebrand, Rochester Hills, MI (US); Michael E. Johnson, Rochester, MI (US); James R. Brichta, Highland, MI (US)

(73) Assignee: AxleTech International IP Holdings, LLC, Troy, MI (US)

( * ) Notice: Subject to any disclaimer, the term of this patent is extended or adjusted under 35 U.S.C. 154(b) by 139 days.

(21) Appl. No.: 10/116,206

(22) Filed: Apr. 4, 2002

(65) Prior Publication Data

US 2003/0188935 A1 Oct. 9, 2003

(51) Int. Cl.[7] .............................................. F16D 65/78
(52) U.S. Cl. ............................... 188/264 R; 188/264 P; 74/606 A
(58) Field of Search ...... 74/606 A; 188/264 R–264 W, 188/71.6; 184/6.22

(56) References Cited

U.S. PATENT DOCUMENTS

| | | | |
|---|---|---|---|
| 2,325,647 A | 8/1943 | Adamson | 74/606 |
| 3,118,387 A | 1/1964 | Aldrich | |
| 3,224,218 A * | 12/1965 | New | 62/239 |
| 3,347,344 A | 10/1967 | Troy | 188/264 |
| 3,590,960 A | 7/1971 | Reynolds | |
| 3,592,304 A | 7/1971 | Thompson | |
| 3,713,517 A * | 1/1973 | Sommer | 192/18 A |
| 3,730,301 A | 5/1973 | Heck et al. | |
| 3,752,132 A * | 8/1973 | Bentz et al. | 123/563 |
| 3,814,222 A | 6/1974 | Koivunen | |
| 3,907,073 A | 9/1975 | Harrison | |
| 3,949,844 A * | 4/1976 | Larson et al. | 188/264 P |
| 4,069,906 A | 1/1978 | Handke | |
| 4,508,200 A | 4/1985 | Cigognini | |
| 4,736,821 A | 4/1988 | Ries | |
| 4,799,564 A * | 1/1989 | Iijima et al. | 180/65.5 |
| 5,190,123 A | 3/1993 | Hvolka | |
| 5,890,983 A * | 4/1999 | Kawahara et al. | 475/149 |
| 5,927,384 A | 7/1999 | Waldner, Jr. | 165/47 |
| 5,954,166 A * | 9/1999 | Maeda | 188/264 P |
| 6,036,615 A * | 3/2000 | Young et al. | 475/161 |
| 6,041,898 A * | 3/2000 | Maeda | 188/264 P |
| 6,296,087 B1 * | 10/2001 | Bissonnette et al. | 188/264 F |
| 6,305,505 B1 * | 10/2001 | Johnston et al. | 188/71.2 |
| 6,499,565 B1 * | 12/2002 | Coyle et al. | 74/606 A |

FOREIGN PATENT DOCUMENTS

| | | | |
|---|---|---|---|
| DE | 1655239 | 9/1967 | |
| DE | 4212243 | 10/1992 | |
| FR | 1383257 | 11/1964 | |
| GB | 549619 | 11/1942 | |
| JP | 07103316 A * | 4/1995 | F16H/57/04 |

* cited by examiner

Primary Examiner—Robert Siconolfi
(74) Attorney, Agent, or Firm—Howard & Howard

(57) ABSTRACT

A system for controlling the temperature of a vehicle driveline component assembly includes using forced air to cool lubricant within the assembly. As heat builds up during braking applications, for example, a controller determines when additional cooling may be needed. An air source is activated to induce air flow through at least one flow passage supported relative to the housing so that the air flowing through the passage can absorb heat from the lubricant. In one example, the air flow passage is supported within the component housing. In another example, the air flow passage is associated with a heat exchanger supported external to the component housing in a strategic location on the vehicle or the housing, for example. A pump responsible for causing the air flow preferably also causes lubricant flow in a desired manner to facilitate heat dissipation.

20 Claims, 2 Drawing Sheets

SYSTEM FOR CONTROLLING THE TEMPERATURE OF A VEHICLE DRIVELINE COMPONENT UTILIZING FORCED AIR FLOW

BACKGROUND OF THE INVENTION

This invention generally relates to temperature control for a vehicle driveline component assembly. More particularly, this invention relates to a system utilizing forced air flow to maintain a temperature of a vehicle driveline component closer to a desired range.

A variety of vehicles are manufactured for a variety of purposes. Examples include passenger vehicles, heavy vehicles such as trucks, and off highway vehicles. Each type of vehicle has particular component requirements to meet the needs of the typical situation in which the vehicle is placed during use. Accordingly, a variety of vehicle components have been developed, each having its own benefits and, in some cases, shortcomings or drawbacks.

In off-highway type vehicles, for example, oil in the brake and axle assemblies tends to heat up during braking applications. In many cases, especially in the case of liquid cooled wet disc brakes, the generated heat exceeds that which can be dissipated by the axle assembly or brake assembly using normal passive methods.

The heat build up must be dissipated to maximize component life and oil performance. The fatigue performance of components such as gears decreases with incremental rises in temperature. By maintaining an adequate temperature for such components, the fatigue performance is enhanced. In addition, oil properties tend to degrade at elevated temperatures.

Vehicle manufacturers and suppliers have been forced to design complex and often undesirably costly cooling systems in an attempt to regulate the temperature within the components resulting from braking applications. Alternative heat dissipation techniques are needed.

This invention provides a temperature regulation strategy that economically maintains at least a portion of a driveline component, such as an axle or brake assembly, within a desired operating range.

SUMMARY OF THE INVENTION

In general terms, this invention is a system for controlling the temperature of a vehicle driveline component that includes utilizing forced air flow to absorb heat from within the component to promote heat dissipation.

A system designed according to this invention includes a driveline component assembly housing that houses at least some of an operative portion of the component assembly. At least one lubricant fluid is maintained within the housing. A source of a selected gas, preferably air, is supported in a strategic location relative to the driveline component assembly. At least one gas flow passage is supported relative to the housing such that the passage allows the gas to absorb heat from at least some of the lubricant as the gas flows through the passage.

In one example, the gas flow passage is within the driveline component assembly housing. In another example, there are a plurality of such passages within the housing.

Another example embodiment of this invention includes a heat exchanger supported outside of the housing of the component assembly. The gas flow passage extends at least part way through the heat exchanger. A dual action pump causes flow of the lubricant into the heat exchanger and then back into the component housing. As the lubricant passes through the heat exchanger, the air flow, which preferably is also generated by the same pump that is responsible for the lubricant flow, facilitates dissipating heat from the liquid before it is returned to the component housing.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
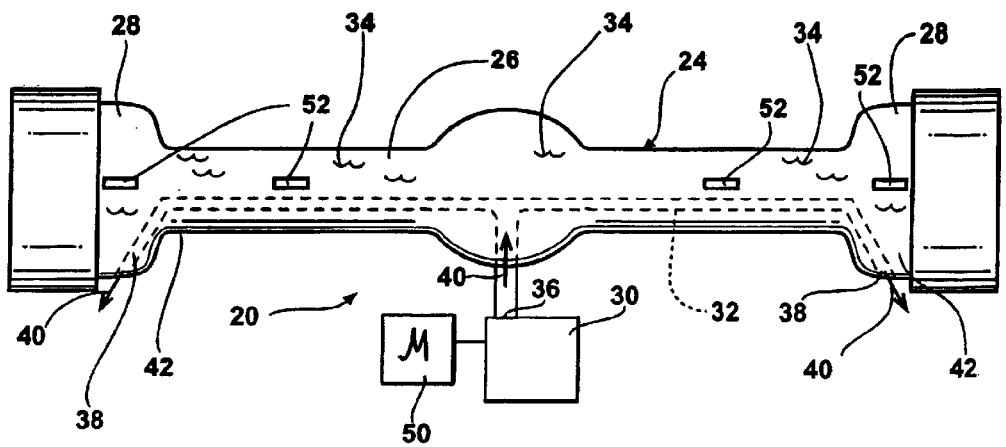
FIG. 1 schematically illustrates a system designed according to this invention.

FIG. 1 schematically illustrates a system 20 for controlling the temperature of a vehicle driveline component assembly 24. The illustrated example includes a component assembly 24 having an axle assembly portion 26 and brake assembly portions 28. One particular example includes wet disk brake assemblies 28. Such an arrangement is particularly useful for off-highway vehicles, although this invention is not necessarily so limited. The heat build up that occurs during braking applications in such an off-highway vehicle driveline component assembly renders this invention particularly useful for such situations.

The system 20 includes an air source 30, which preferably includes a pump. At least one flow passageway 32 is supported relative to the component assembly 24 so that air flowing through the passageway 32 is able to absorb heat from a lubricant 34 as the air flows through the passageway 32. The example air flow passageway 32 includes an inlet 36 coupled with the air source 30 and outlets 38 that allow the air flow through the paseege passanewav 32 to be exhausted as schematically illustrated by the arrows 40. In the illustrated example, the exhausted air flow 40 preferably is directed into an area between the exterior portion of the housing 42 surrounding the brake assemblies 28 and a wheel rim (not illustrated). The air flow provided into such an area facilitates further heat dissipation as the region between the housing and the wheel rim is recognized as a dead air space. Increasing air flow in such a region facilitates heat dissipation from the housing in that region. Appropriate fittings at the outlets 38 of the flow passageway 32 prevent dirt or other contaminants from entering or blocking the air flow passageway 32. Given this description, those skilled in the art will be able to select from among commercially available components or to custom design such components to achieve the desired effect.

A controller 50 preferably communicates with one or more temperature sensors 52 that provide an indication of a temperature within the component assembly 24. The temperature sensors 52 may be any of a variety of known sensors capable of functioning in an axle or brake assembly environment, for example. The controller 50 preferably is programmed to cause operation of the pump within the air source 30 to cause the air flow 40 to occur whenever the temperature within the component assembly 24 is above a selected temperature. Given this description, those skilled in the art will be able to choose appropriate temperature thresholds to meet the needs of a particular driveline component assembly. In another example, the air flow 40 is continuously provided while the vehicle is being used.

The controller 50 can be a commercially available microprocessor. In one example the controller 50 is a dedicated microprocessor. In another example, the microprocessor 50 is a portion of an engine controller already present on the vehicle. A variety of controllers on vehicles are known. Those skilled in the art who have the benefit of this description will be able to select from among commercially available components or to custom design circuitry and to suitably program the controller to accomplish the results provided by this invention to meet the needs of their particular situation.

The air flow passagewav 32 may be within the component assembly 24 or outside of it, depending on the particular arrangement of components on a given vehicle.

Figure 2:
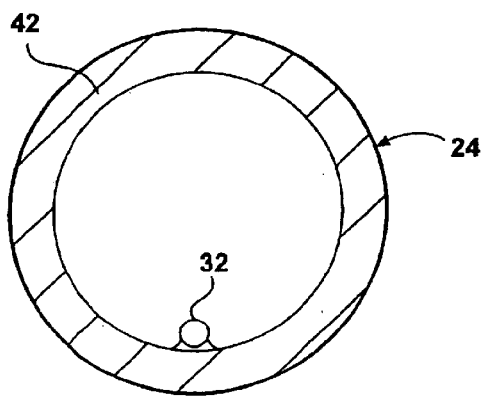
FIG. 2 is a cross sectional illustration showing a selected portion of one example system designed according to this invention.

There are a variety of ways of incorporating the air flow passage 32 within the housing 42 of the component assembly 24. One example is shown in FIG. 2 where a single air flow passage 32 extends within the interior of the housing 42. The air flow passage 32 may extend linearly through the housing 42. In another example, the air flow passage 32 has a generally serpentine pathway. In still another example, the air flow passageway winds at least partially circumferentially through the housing 42.

Figure 3:
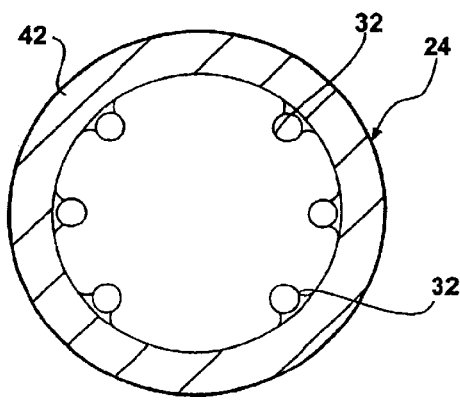
FIG. 3 is a cross sectional illustration schematically illustrating another example arrangement of air flow passages designed according to this invention.
Figure 4:
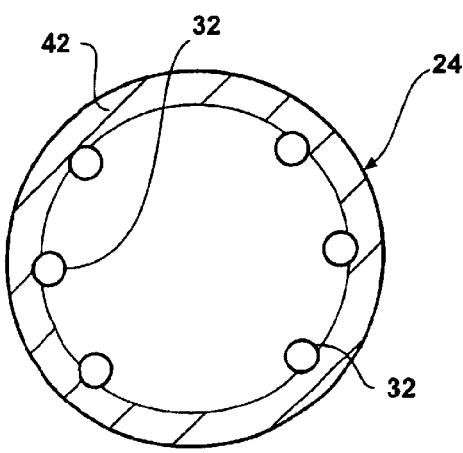
FIG. 4 illustrates an alternative to the embodiment of FIG. 3.
Figure 5:
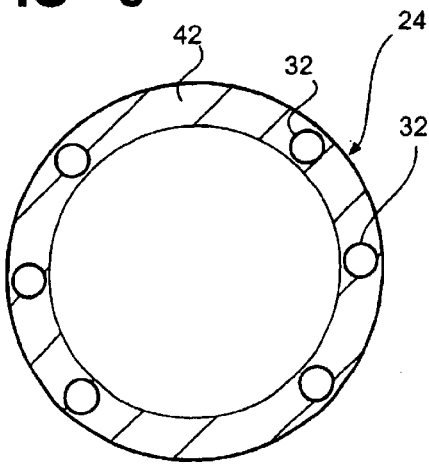
FIG. 5 illustrates another alternative arrangement compared to the embodiments of FIGS. 2 through 4.

Another example is shown in FIG. 3 where a plurality of air flow passages 32 are incorporated within the housing 42. FIG. 4 illustrates an example where the air flow passages 32 are at least partially embedded into a wall of the housing 42. The example of FIG. 5 shows the air flow passages 32 formed within the housing 42.

Tubing for the air flow passages 32 preferably are made from a portion of the housing 42 or from a suitable material, such as metal, that will be able to withstand the temperatures and other factors within the environment of the housing 42. The air flow passageway (or multiple passageways) 32 preferably is situated within the housing 42 such that it does not require redesign of any of the operative components of the axle assembly 26 or the brake assemblies 28.

Although air is the preferred gas to flow through the passageway 32, other gases or fluids may be used to achieve a different cooling effect. Air is believed to be an economical selection and provides the advantage of being able to be vented to atmosphere without any environmental considerations. Further, any number of a variety of commercially available air pumps can be incorporated into the system 20 to achieve the desired air flow in an economical manner.

Figure 6:
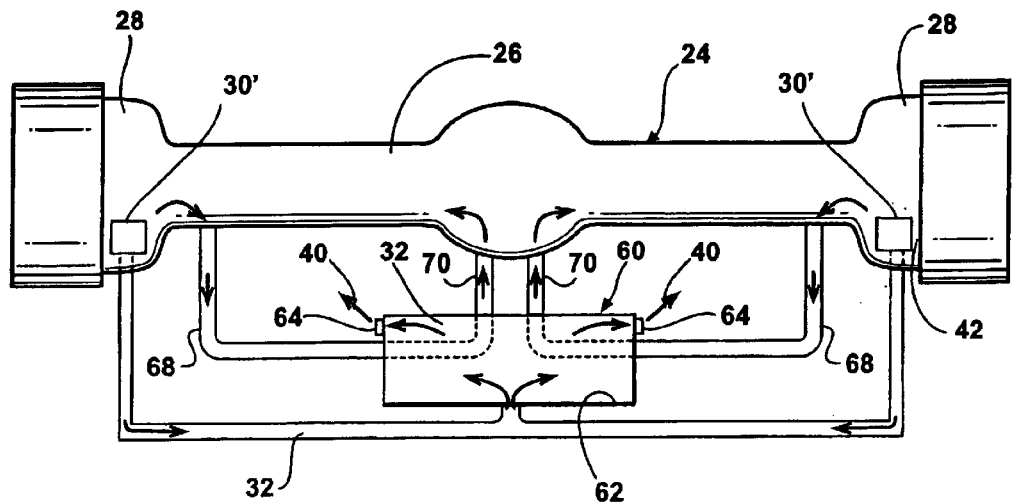
FIG. 6 schematically illustrates an alternative system designed according to this invention, including a heat exchanger supported external to the component assembly housing.

FIG. 6 schematically illustrates another arrangement designed according to this invention. The example of FIG. 6 does not specifically illustrate the controller 50 or temperature sensors 52 for simplicity. The controller 50 and temperature sensors 52 preferably are incorporated in such a system.

The example of FIG. 6 includes a modified air source 30' that includes a dual action pump. One function of the pump is to cause the air flow 40 through the air passageway 32. Another function of the pump is to cause a flow of the lubricant 34 from within the housing 42 into a heat exchanger 60. The air flow 40 through the passageway 32 preferably flows through at least a portion of the heat exchanger 60 so that the air flow operates to cool the lubricant 34 present within the heat exchanger 60 before that lubricant is returned to the housing 42.

The illustrated heat exchanger 60 includes an interior compartment 62 which is a portion of the air flow passageway 32. At least one outlet 64 allows the air flow to vent out of the interior compartment 62 of the heat exchanger 60.

As the lubricant 34 is pumped through exterior tubing 68 into the heat exchanger 60, it has a first temperature. After flowing through the tubing 68 within the heat exchanger 60, in part because of the air flow 40 through the interior 62 of the heat exchanger 60, the lubricant 34 is cooled before it returns to the housing 42 through return tubing 70.

In one example, a dual purpose air source 30' including a lubricant pump feature preferably is associated with each wheel end of the driveline component assembly 24. Pumps that operate based upon rotation of vehicle wheels can be incorporated into a system designed according to this invention.

The heat exchanger 60 preferably is supported external to the housing 42 of the driveline component assembly 24. The number of flow passages for lubricant or air through the heat exchanger 60 may be varied depending upon the needs of a particular situation. The schematic illustration of FIG. 6 is intended to provide one example implementation of such a system designed according to this invention.

Figure 7:
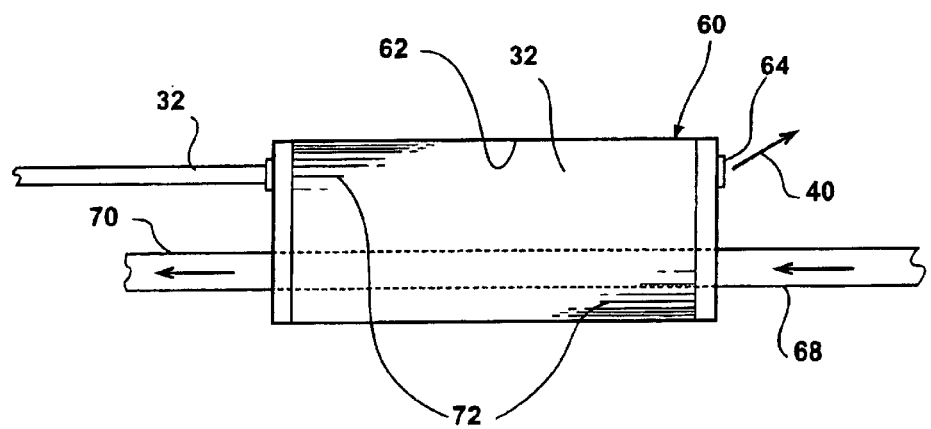
FIG. 7 schematically illustrates another example heat exchanger that is useful within a system designed according to this invention.

FIG. 7 illustrates another heat exchanger arrangement 60 that includes a plurality of fins 72 associated with the lubricant flow passage through the heat exchanger 60. The fins 72 facilitate heat dissipation from the lubricant within the supply tubing 68 before it is returned to the housing through the return tubing 70. Aluminum is one example material to be used for the fins 72. The fins facilitate greater heat dissipation especially because of the forced air flow 40 through the interior 62 of the heat exchanger 60.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

What is claimed is:

1. A vehicle axle assembly, comprising:
    a housing having an interior surface with opposed distal ends and a central portion;
    an axle shaft supported within said housing;
    a brake device supported within said housing adjacent each distal end of said housing;
    a lubricant disposed within said housing that increases in temperature as heat is generated by operation of said brake devices; and
    a pair of tubes mounted to said interior surface of said housing with each of said tubes defining a gas flow passageway, each of said tubes including an inlet mounted at said central portion and one of said tubes extending to an outlet at one of said distal ends and another of said tubes extending to an outlet at an opposed distal end for exhausting a gas adjacent both of said brake devices wherein the gas absorbs heat from at least some of said lubricant as the gas flows through said passageways.

2. The assembly of claim 1, wherein said outlets exhaust vented air to atmosphere after the vented air passes over said brake devices.

3. The assembly of claim 1, wherein said pair of tubes are further defined as a plurality of tubes each defining a gas flow passage with some of said plurality of tubes extending toward one of said distal ends and the remaining of said plurality of tubes extending toward an opposed distal end.

4. The assembly of claim 1, wherein said pair of tubes spiral in a serpentine fashion about said interior surface of said housing.

5. The assembly of claim 1, wherein each of said tubes define an air flow passageway for exhausting air adjacent each of said brake devices.

6. The assembly of claim 5, including a pump in fluid communication with said tubes for causing the air to flow through said gas flow passageways in a selected direction toward said brake devices.

7. The assembly of claim 6, including a heat exchanger having a portion through which at least some of said lubricant flows responsive to operation of said pump and wherein said tubes are supported such that heat is absorbed from said lubricant that flows through said heat exchanger.

8. A vehicle axle assembly, comprising:

a housing defining a wall;

an axle shaft supported within said housing;

a lubricant disposed within said housing that increases in temperature as heat is generated during operation of said axle assembly; and at least one gas flow passageway having an inlet and an outlet with a majority of said passageway between said inlet and outlet at least partially embedded within said wall of said housing wherein said passageway has a gas passing therethrough to absorb heat from at least some of said lubricant as the gas flows through said passageway thereby cooling said lubricant.

9. The assembly of claim 8, wherein said at least one gas flow passageway further includes a plurality of gas flow passageways at least partially embedded within an interior portion of said wall of said housing.

10. The assembly of claim 8, wherein said at least one gas flow passageway further includes a plurality of gas flow passageways fully embedded within said wall of said housing.

11. The assembly of claim 8, including a heat exchanger having a portion through which at least some of said lubricant flows and wherein said gas flow passageway is supported such that heat is absorbed from said lubricant flowing through said heat exchanger.

12. The assembly of claim 8, wherein said at least one gas flow passageway is further defined as an air flow passageway having air passing therethrough to absorb heat.

13. The assembly of claim 12, including a pump in fluid communication with said air flow passageway for causing the air to flow through said passageway in a selected direction.

14. The assembly of claim 13, including a brake device supported within said housing adjacent each distal end of said housing.

15. The assembly of claim 14, wherein said outlet directs air that has absorbed heat from said lubricant toward said brake devices.

16. A vehicle axle assembly, comprising:

a housing having opposed distal ends;

an axle shaft supported within said housing;

a lubricant disposed within said housing that increases in temperature as heat is generated during operation of said axle assembly;

a heat exchanger mounted exterior to said housing;

at least one gas flow passageway supported relative to said housing with said passageway being in fluid communication with said heat exchanger wherein a gas passing through said passageway is exhausted into said heat exchanger, said gas flow passageway is further defined as a tube having a first end connected to said housing and a second end connected to said heat exchanger such that at least a portion of said tube is supported exterior to said housing; and at least one lubricant conduit connected to said housing and at least partially passing through said heat exchanger exterior to said housing, said lubricant conduit being in fluid communication with said lubricant to allow a portion of said lubricant to flow outside of said housing through said conduit wherein the gas exhausting into said heat exchanger absorbs heat from at least some of said lubricant to cool said lubricant.

17. The assembly of claim 16, wherein said lubricant conduit is further defined as an exterior tube connected between said housing and an inlet of said heat exchanger and a return tube connected between an outlet of said heat exchanger and said housing.

18. The assembly of claim 16, wherein said at least one gas flow passageway is further defined as an air flow passageway wherein air passing through said passageway is exhausted into said heat exchanger.

19. The assembly of claim 16, including a dual action pump in fluid communication with said gas flow passageway and said lubricant conduit for pumping the gas through the passageway and simultaneously pumping the lubricant through the conduit.

20. The assembly of claim 19, wherein said pump causes the gas to flow in a first direction through said gas flow passageway and causes said lubricant to flow in a second opposite direction through said conduit.

* * * * *